(12) United States Patent
Masuda (10) Patent No.: US 10,525,947 B2
(45) Date of Patent: Jan. 7, 2020

(54) FRICTION BRAKE SYSTEM (71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/869,804

(22) Filed: Jan. 12, 2018

(65) Prior Publication Data
US 2018/0134264 A1 May 17, 2018

Related U.S. Application Data

(63) Continuation of application No. PCT/JP2016/071134, filed on Jul. 19, 2016.

(30) Foreign Application Priority Data

Jul. 27, 2015 (JP) .................................. 2015-147585

(51) Int. Cl.
*B60T 8/17* (2006.01)
*B60T 8/00* (2006.01)
(Continued)

(52) U.S. Cl.
CPC ................ *B60T 8/172* (2013.01); *B60T 8/00* (2013.01); *B60T 8/173* (2013.01); *B60T 8/1755* (2013.01);
(Continued)

(58) Field of Classification Search
CPC . B60T 8/172; B60T 8/00; B60T 13/74; B60T 13/741; B60T 17/221
See application file for complete search history.

(56) References Cited

U.S. PATENT DOCUMENTS 3,022,114 A * 2/1962 Sampietro ............... B60T 8/172
303/15
5,255,962 A  10/1993 Neuhaus et al.
(Continued)

FOREIGN PATENT DOCUMENTS

CN  101065280 A  10/2007
DE  196 17 285  8/1997
(Continued)

OTHER PUBLICATIONS

English Translation of the International Preliminary Report on Patentability dated Feb. 8, 2018, in corresponding International Patent Application No. PCT/JP2016/071134, 9 pgs.
(Continued)

*Primary Examiner* — Thomas J Williams
*Assistant Examiner* — James K Hsiao (57) ABSTRACT

The friction brake system includes a braking force distributor configured to output load command values to friction brake devices for a plurality of wheels, and a friction coefficient estimation calculation section configured to estimate a friction coefficient between a brake rotor and a friction material of each friction brake device. The friction coefficient estimation calculation section includes a distribution adjustment section configured to change distribution of brake pressing force to be distributed by the braking force distributor, for estimation of the friction coefficient, and an estimation calculation section configured to estimate the friction coefficient on the basis of a relationship between deceleration of a vehicle and the load command values the distribution of which is changed.

8 Claims, 7 Drawing Sheets

(51) Int. Cl.
*B60T 13/74* (2006.01)
*B60T 8/172* (2006.01)
*B60T 8/173* (2006.01)
*B60T 8/1755* (2006.01)
*B60T 17/22* (2006.01)
*F16D 65/18* (2006.01)
*F16D 66/00* (2006.01)
*F16D 121/24* (2012.01)

(52) U.S. Cl.
CPC ............ *B60T 13/74* (2013.01); *B60T 13/741* (2013.01); *B60T 17/221* (2013.01); *F16D 65/18* (2013.01); *F16D 66/00* (2013.01); *F16D 2066/005* (2013.01); *F16D 2121/24* (2013.01)

(56) References Cited

U.S. PATENT DOCUMENTS

| | | | | |
|---|---|---|---|---|
| 5,511,859 | A * | 4/1996 | Kade | B60W 20/13 303/3 |
| 5,676,434 | A * | 10/1997 | Ichikawa | B60T 8/172 303/150 |
| 5,902,019 | A | 5/1999 | Maron et al. | |
| 6,086,166 | A * | 7/2000 | Fukasawa | B60L 3/0023 303/122.04 |
| 6,122,585 | A * | 9/2000 | Ono | B60T 8/172 180/197 |
| 6,230,854 | B1 | 5/2001 | Schwarz et al. | |
| 6,270,172 | B1 | 8/2001 | Shirai et al. | |
| 6,425,643 | B2 | 7/2002 | Shirai et al. | |
| 7,258,404 | B2 | 8/2007 | Butler, III et al. | |
| 7,775,607 | B2 | 8/2010 | Butler, III et al. | |
| 7,810,616 | B2 | 10/2010 | Nakazeki | |
| 7,957,875 | B2 * | 6/2011 | Antanaitis | B60T 8/172 188/1.11 R |
| 2001/0033106 | A1 | 10/2001 | Shirai et al. | |
| 2002/0007661 | A1 * | 1/2002 | Takahashi | B60T 8/172 73/9 |
| 2005/0161295 | A1 | 7/2005 | Nilsson et al. | |
| 2006/0097567 | A1 * | 5/2006 | Butler, III | B60T 8/321 303/20 |
| 2006/0220449 | A1 * | 10/2006 | Svensson | B60T 8/1708 303/20 |
| 2007/0068220 | A1 * | 3/2007 | Mahajan | G01N 19/02 73/9 |
| 2007/0273204 | A1 * | 11/2007 | Kodama | B60K 6/48 303/146 |
| 2008/0015766 | A1 | 1/2008 | Butler, III et al. | |
| 2008/0110704 | A1 | 5/2008 | Nakazeki | |
| 2009/0012686 | A1 * | 1/2009 | Maeda | B60T 8/174 701/70 |
| 2009/0063002 | A1 * | 3/2009 | Ono | B60T 8/172 701/83 |
| 2009/0187320 | A1 * | 7/2009 | Antanaitis | B60T 8/172 701/70 |
| 2014/0166413 | A1 * | 6/2014 | Giering | B60T 13/741 188/156 |
| 2016/0039292 | A1 * | 2/2016 | Takahashi | B60W 10/08 701/70 |
| 2016/0243943 | A1 | 8/2016 | Sugai | |
| 2018/0079403 | A1 * | 3/2018 | Masuda | B60T 8/172 |

FOREIGN PATENT DOCUMENTS

| | | |
|---|---|---|
| EP | 0 467 112 | 1/1992 |
| EP | 0 894 685 | 2/1999 |
| JP | 6-327190 | 11/1994 |
| JP | 9-312903 | 12/1997 |
| JP | 3673284 | 4/2005 |
| JP | 2006-194356 | 7/2006 |
| JP | 4116084 | 4/2008 |
| JP | 2009-113717 | 5/2009 |
| JP | 4329613 | 6/2009 |
| JP | 4737058 | 5/2011 |
| JP | 2014-69756 | 4/2014 |
| JP | 2015-100149 | 5/2015 |
| WO | 2006/052771 A2 | 5/2006 |

OTHER PUBLICATIONS

International Search Report dated Sep. 20, 2016 in corresponding International Patent Application No. PCT/JP2016/071134.
Japanese Office Action dated Jun. 4, 2019 in corresponding Japanese Patent Application No. 2015-147585.
Extended European Search Report dated Mar. 21, 2019 in corresponding European Patent Application No. 16830374.1 (7 pages).
Office Action dated Jul. 26, 2019 in related Chinese patent application No. 201680043241.1.
Decision of Grant dated Oct. 1, 2019 in corresponding Japanese patent application No. 2015-147585.

* cited by examiner

FRICTION BRAKE SYSTEM

CROSS REFERENCE TO THE RELATED APPLICATION

This application is a continuation application, under 35 U.S.C. § 111(a), of international application No. PCT/JP2016/071134, filed Jul. 19, 2016, which is based on and claims Convention priority to Japanese patent application No. 2015-147585, filed Jul. 27, 2015, the entire disclosure of which is herein incorporated by reference as a part of this application.

BACKGROUND OF THE INVENTION

Field of the Invention

The present invention relates to a friction brake system including a plurality of friction brake devices provided in a vehicle and a control unit for the friction brake devices.

Description of Related Art

Conventionally, as a friction brake device or a control method therefor, the following proposals have been made.
  Electric brake actuators using an electric motor, a linear motion mechanism, and a speed reducer (Patent Document 1).
  Electric actuators using a planetary roller mechanism and an electric motor (Patent Document 2).
  Electric brakes that detect pressing force with a strain gauge (Patent Document 3).
  Electric brake systems that cancel a yaw rate generated due to a brake defect (Patent Document 4).

RELATED DOCUMENT

Patent Document

[Patent Document 1] JP Laid-Open Patent Publication No. H06-327190
[Patent Document 2] JP Laid-Open Patent Publication No. 2006-194356
[Patent Document 3] JP Patent No. 4116084
[Patent Document 4] JP Laid-Open Patent Publication No. H09-312903

As a method for achieving high-accuracy braking force control with a cheap configuration in friction brake devices capable of independently controlling braking forces for four wheels as in Patent Documents 1 to 4, a method is generally known in which pressing force of a friction material corresponding to the fluid pressure of a hydraulic brake is controlled as in Patent Document 3. In this method, since actually generated braking force depends on the friction coefficient between the friction material and a brake rotor serving as a counterpart thereof, there is a possibility that unexpected yaw moment occurs due to variations in the friction coefficient of the friction material, resulting in deterioration of brake feeling.

For example, in the case where a method in which control is performed so as to cancel a yaw rate as disclosed in Patent Document 4 is applied, control for correction cannot be applied unless a yaw rate is actually detected, and timing of such control deviates from appropriate timing due to a delay caused thus, so that there is a possibility that vehicle behavior becomes vibratory. In addition, when influence of vibration or noise cannot be completely eliminated, there is a possibility that vehicle behavior becomes vibratory.

SUMMARY OF THE INVENTION

An object of the present invention is to provide a friction brake system that enables distribution to each brake after estimation of friction coefficients and that allows stable vehicle behavior and brake feeling of friction brake devices to be achieved with high accuracy during braking. Another object of the present invention is to allow the friction coefficient of a friction brake device to be estimated accurately.

Hereinafter, in order to facilitate understanding of the present invention, the present invention will be described with reference to the reference numerals in embodiments for the sake of convenience.

A friction brake system according to the present invention is a friction brake system comprising at least a plurality of friction brake devices provided in a vehicle, and a higher-order control unit including a braking force distributor configured to distribute target brake pressing force to each friction brake device in accordance with requested braking force, each friction brake device including: a brake actuator having a brake rotor, a friction material, and a friction material actuator configured to press the friction material against the brake rotor; and an individual brake controller configured to control output of the friction material actuator in accordance with the target brake pressing force distributed from the braking force distributor, wherein
  the friction brake system comprises a braking friction coefficient estimator configured to estimate a friction coefficient between the brake rotor and the friction material of each friction brake device, the friction coefficient being reflected by distribution of the brake pressing force by the braking force distributor.

Due to this configuration, distribution of each brake is enabled after the friction coefficient is accurately estimated, and stable vehicle behavior and brake feeling can be achieved with high accuracy during braking.

A first friction brake system according to the present invention is a friction brake system comprising a plurality of friction brake devices 3 provided in a vehicle 1, and a higher-order control unit 6 including a braking force distributor 12 configured to distribute target brake pressing force to each friction brake device 3 in accordance with requested braking force, each friction brake device 3 including: a brake actuator 4 having a brake rotor 31, a friction material 32, and a friction material actuator 33 configured to press the friction material 32 against the brake rotor 31; and an individual brake controller 5 configured to control output of the friction material actuator 33 in accordance with the target brake pressing force distributed from the braking force distributor 12, wherein
  the friction brake system includes a braking friction coefficient estimator 14 configured to estimate a friction coefficient between the brake rotor 31 and the friction material 32 of each friction brake device 3, and the braking force distributor 12 has a function to calculate the target brake pressing force to be distributed to each friction brake device 3, such that the friction coefficient of each friction brake device 3 estimated by the braking friction coefficient estimator 14 is reflected therein.

According to this configuration, distribution of the brake pressing force to each friction brake device in accordance with the requested braking force is enabled after the friction coefficient is estimated and reflected, and stable vehicle behavior and brake feeling of the friction brake devices can be achieved with high accuracy during braking.

In the first friction brake system, the braking friction coefficient estimator 14 may include: an estimation distribution adjustment section 15 configured to change the brake pressing force to be distributed from the braking force distributor 12, in a predetermined combination, for estimation of the friction coefficient; and an estimation calculation section 17 configured to estimate the friction coefficient on the basis of a relationship between deceleration of the vehicle and the brake pressing force the distribution of which has been changed. In the case of this configuration, the braking friction coefficient estimator 14 changes the brake pressing force to be distributed from the braking force distributor 12, in the predetermined combination, for estimation of the friction coefficient. When braking is performed with the brake pressing force changed in the predetermined combination, the estimation calculation section 17 estimates the friction coefficient between the brake rotor 31 and the friction material 32 for each wheel 2 on the basis of generated braking force. Thus, the friction coefficient between the brake rotor 31 and the friction material 32 for each wheel 2 can be accurately estimated by the estimation calculation section 17.

Another friction brake system according to the present invention is a friction brake system comprising a plurality of friction brake devices 3 provided in a vehicle 1, and a higher-order control unit 6 including a braking force distributor 12 configured to distribute target brake pressing force to each friction brake device 3 in accordance with requested braking force, each friction brake device 3 including: a brake actuator 4 having a brake rotor 31, a friction material 32, and a friction material actuator 33 configured to press the friction material 32 against the brake rotor 31; and an individual brake controller 5 configured to control output of the friction material actuator 33 in accordance with the target brake pressing force distributed from the braking force distributor 12, wherein the friction brake system includes a braking friction coefficient estimator 14 configured to estimate a friction coefficient between the brake rotor 31 and the friction material 32 of each friction brake device 3, and the braking friction coefficient estimator 14 includes: an estimation distribution adjustment section 15 configured to change the brake pressing force to be distributed from the braking force distributor 12, in a predetermined combination, for estimation of the friction coefficient; and an estimation calculation section 17 configured to estimate the friction coefficient on the basis of a relationship between deceleration of the vehicle and the brake pressing force the distribution of which has been changed.

According to this configuration, the braking friction coefficient estimator 14 changes the brake pressing force to be distributed from the braking force distributor 12, in the predetermined combination, for estimation of the friction coefficient. When braking is performed with the brake pressing force changed in the predetermined combination, the estimation calculation section 17 estimates the friction coefficient between the brake rotor 31 and the friction material 32 for each wheel 2 on the basis of generated braking force. Thus, the friction coefficient between the brake rotor 31 and the friction material 32 for each wheel 2 can be accurately estimated by the estimation calculation section 17. If the friction coefficient between the brake rotor 31 and the friction material 32 for each wheel 2 can be estimated as described above, by using the estimated friction coefficient, when the braking force distributor 12 performs distribution, appropriate distribution to each brake device can be performed in accordance with the friction coefficient, even when the friction coefficient of each friction brake device 3 of the vehicle 1 has changed due to wear or the like. Then occurrence of a shift of the vehicle, in the travelling direction, or the like due to the braking force difference, between the right and left wheels 2, or the like is avoided. Therefore, stable vehicle behavior and brake feeling of the friction brake devices can be achieved with high accuracy during braking.

Figure 4:
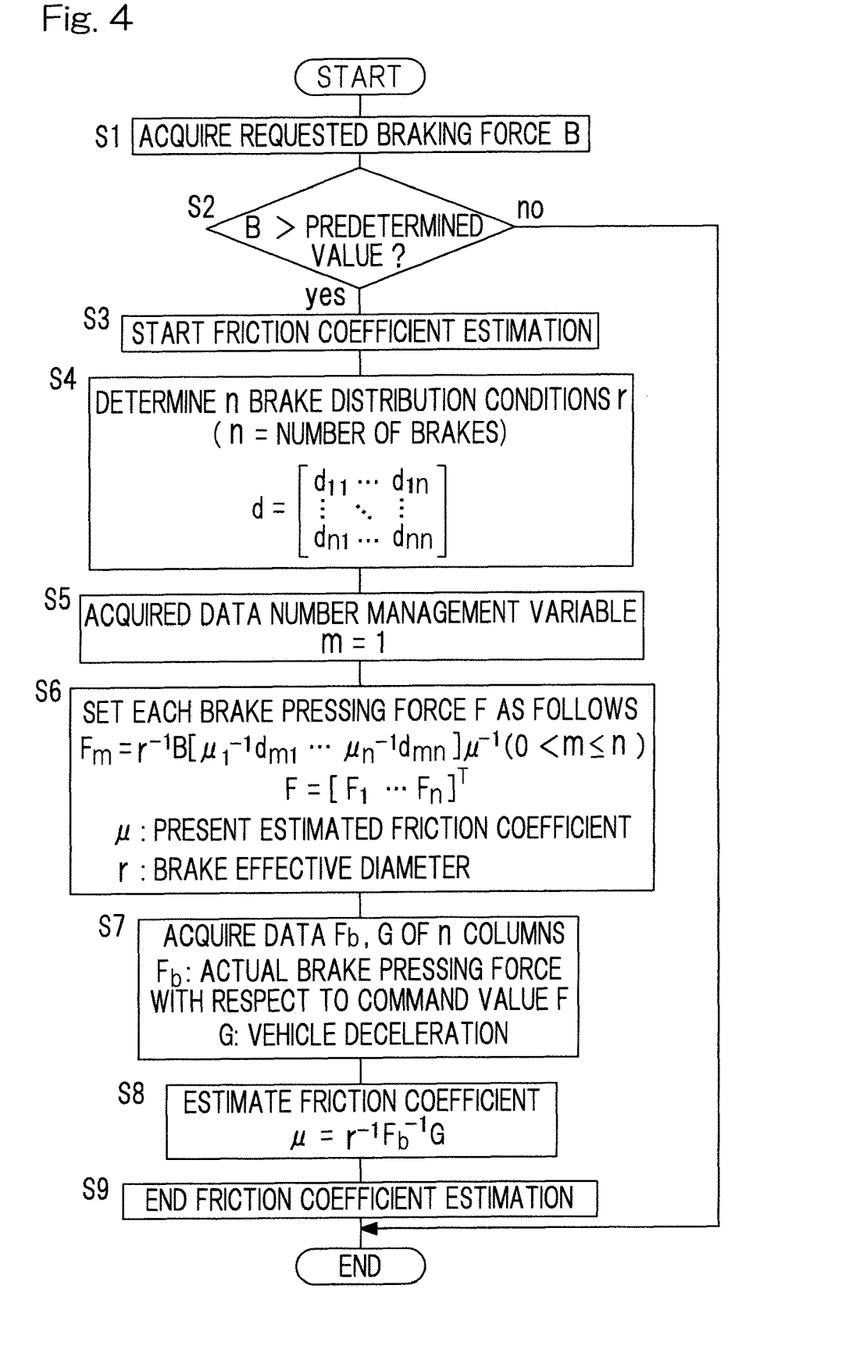
FIG. 4 is a flowchart of a basic process of performing friction coefficient estimation by the friction brake system.

In the present invention, the estimation calculation section 17 of the braking friction coefficient estimator 14 may be configured to perform calculation on the basis of calculation of an equation including the friction coefficient, and the brake pressing force pressing the friction material, and the vehicle deceleration, which are calculation factors, and a predetermined coefficient based on vehicle specifications for satisfying the equation using all of these calculation factors, and the equation may be configured on the basis of a plurality of independent linear expressions (for example, expressions indicating brake pressing amount Fm in step S6 in FIG. 4, an expression for obtaining a friction coefficient μ in step S8 in FIG. 4, etc.) the number of which is equal to the number of the friction brake devices for which the friction coefficient is estimated by the friction coefficient estimation calculation section (or the above-mentioned estimation calculation section). The braking friction coefficient estimator 14 can achieve estimation of the friction coefficient in this manner. The "vehicle specifications" are respective physical quantities of each component forming the vehicle, and are, for example, the effective diameter of the brake rotor, the total weight of the vehicle, a matter of making the unit of each amount coincide, or the like.

In this case, the friction coefficient estimation calculation section 17 may be configured such that, when an absolute value ($|\det(Fb)|$) of a calculation result of a determinant of a full rank matrix including the brake pressing force in the plurality of independent linear expressions is less than a predetermined value (step W2 in FIG. 7), influence of a friction coefficient estimation result derived by using the determinant, on a finally derived friction coefficient estimation result, is made smaller than influence of another friction coefficient estimation result derived when the absolute value is greater than the predetermined value, or the friction coefficient estimation result derived by using the determinant is excluded from estimation results. By omitting, in this manner, an estimation result for which the linear independency is low and which is easily influenced by noise or an estimation error, the reliability of the estimated value of the friction coefficient can be improved.

Figure 6:
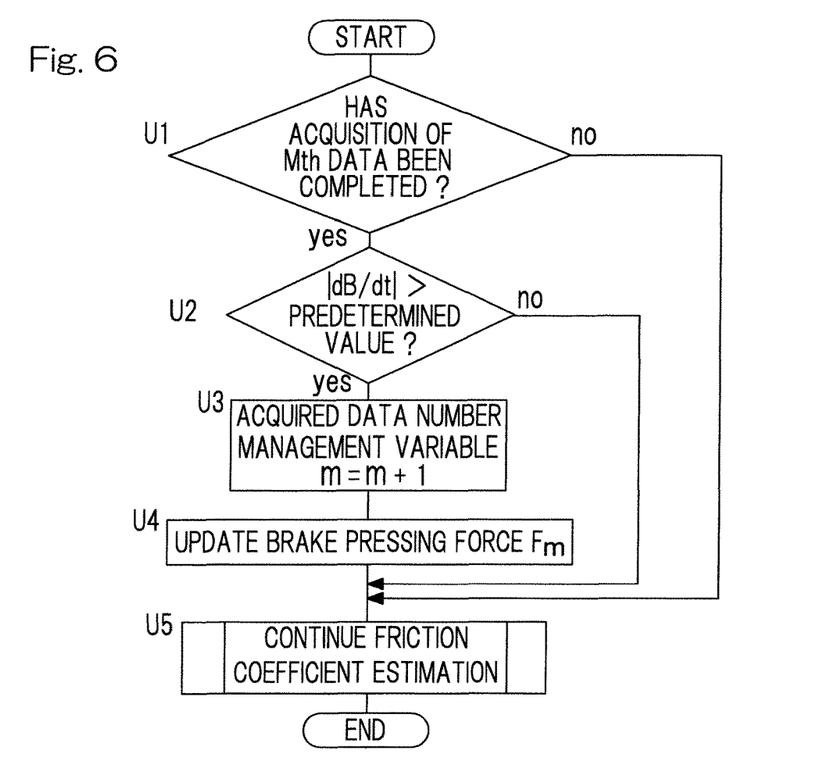
FIG. 6 is a flowchart of a process in which the estimation by the friction brake system is performed when requested braking force changes by a predetermined amount or greater.

In the estimation calculation section 17, the plurality of independent linear expressions may be acquired on the basis of brake distribution changed when an absolute value of an amount of change of the requested braking force is not less than a predetermined value (steps U2 to U4 in FIG. 6). Accordingly, deceleration change due to the distribution change when an estimation result of the friction coefficient includes an error can be made inconspicuous, thereby improving feeling.

In the present invention, the braking force distributor 12 may calculate the brake pressing force that can exert desired braking torque, on the basis of a friction coefficient estimation result of the braking friction coefficient estimator 14, and may send the calculated brake pressing force as a target value to the friction brake device. Since the braking force distributor 12 is configured to perform distribution on the basis of the estimation result of the friction coefficient as described above, a braking force error of each wheel due to a friction coefficient error can be corrected. The "desired braking torque" is torque that should be distributed to each friction brake device 3 in accordance with the requested braking force.

In the present invention, the estimation calculation section 17 of the braking friction coefficient estimator 14 may execute estimation of the friction coefficient when: either one or both of the requested braking force and the actual brake pressing force are not less than a predetermined value; and a vehicle speed of the vehicle equipped with the friction brake system or a lowest value of wheel speeds of the respective wheels 2 to be braked by the friction brake device 3 is not less than a predetermined value. Accordingly, a very low speed region in which deceleration easily includes an error can be excluded from a target for the estimation, and the accuracy or reliability of estimation of the friction coefficient can be increased.

In the present invention, each friction brake device 3 may be an electric friction brake device including an electric motor 34 configured to drive the friction material actuator 33, and the individual brake controller 5 may have a function to control the motor such that the brake pressing force distributed from the braking force distributor 12 follows a target value. When each friction brake device 3 is an electric friction brake device, each friction brake device 3 can be accurately controlled. The control using the estimation result of the friction coefficient by the friction brake system of the present invention can be effectively performed.

A still another friction brake system according to the present invention is an electric friction brake system comprising a plurality of electric friction brake devices 3 provided in a vehicle 1, and a higher-order control unit 6 including a braking force distributor 12 configured to distribute target brake pressing force to each electric friction brake device 3 in accordance with requested braking force, each electric friction brake device 3 including: a brake actuator 34 having a brake rotor 31, a friction material 32, and a friction material actuator 33 configured to press the friction material against the brake rotor 31; and an individual brake controller 5 configured to control output of the friction material actuator 33 in accordance with the target brake pressing force distributed from the braking force distributor 12. Each electric friction brake device 3 includes an electric motor 34 as a drive source for the friction material actuator 33.

A braking friction coefficient estimator 14 is configured to estimate a friction coefficient between the brake rotor 31 and the friction material 32 is provided.

In the case of this configuration, since each friction brake device 3 is an electric brake device, the braking force can be adjusted accurately with good responsiveness. Therefore, the friction coefficient between the brake rotor 31 and the friction material 32 can be estimated accurately by the braking friction coefficient estimator 14. In addition, by using the estimated friction coefficient in distribution of the brake pressing force to each friction brake device 3 and the like, stable vehicle behavior and brake feeling can be achieved with high accuracy during braking.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5 is a flowchart showing a process example when the estimation by the friction brake system is suspended due to fall of braking force or the like;

DESCRIPTION OF EMBODIMENTS

Figure 1:
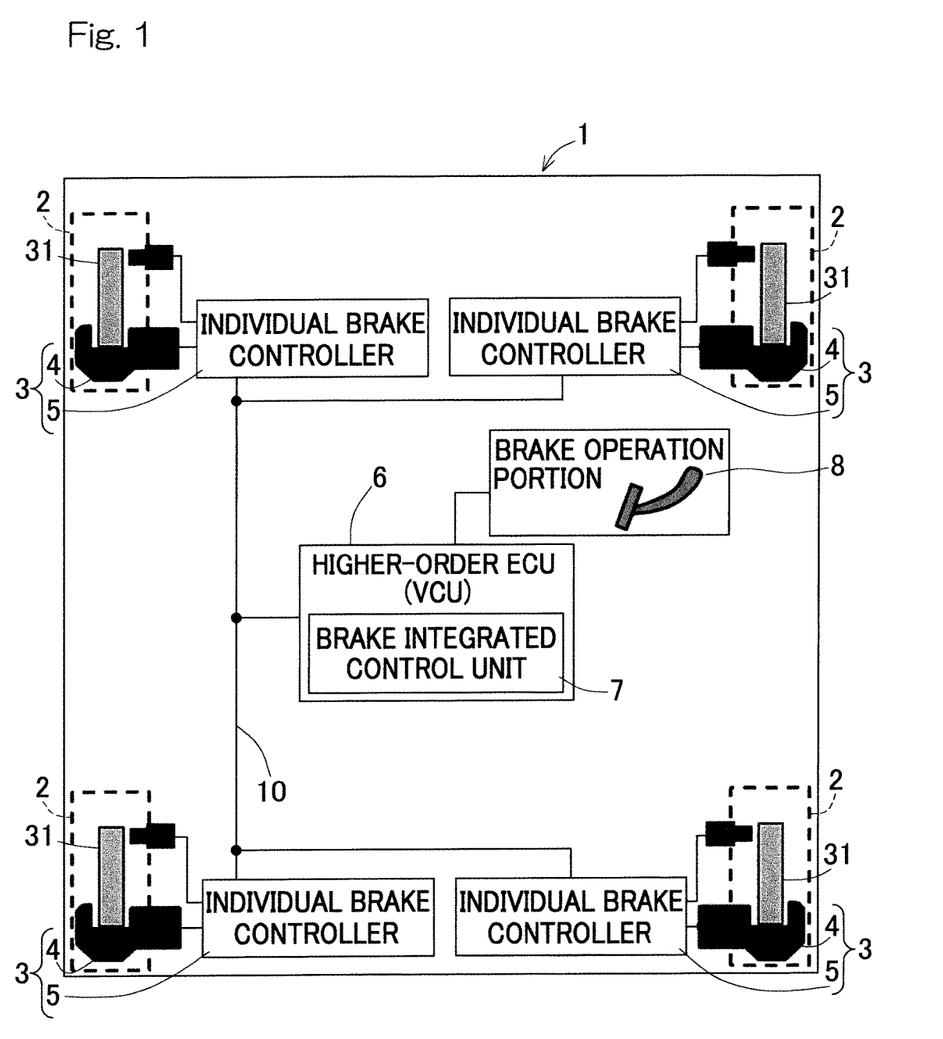
FIG. 1 is a plan view of a schematic configuration of a vehicle to which a friction brake system according to a first embodiment of the present invention is applied.

A first embodiment of the present invention will be described with reference to FIGS. 1 to 7. FIG. 1 shows an example in which a friction brake system of this embodiment is applied to a vehicle such as a four-wheel automobile. In the vehicle 1, a friction brake device 3 is provided to each of right and left wheels 2 at the front side (the upper side in FIG. 1) and the rear side. The running drive source (not shown) is either one or both of an internal combustion engine and an electric motor. The friction brake device 3 is an electric friction brake device in this embodiment as an example, and includes: a brake actuator 4 that is a mechanical mechanism; and an individual brake controller 5 that controls the brake actuator 4.

Figure 2:
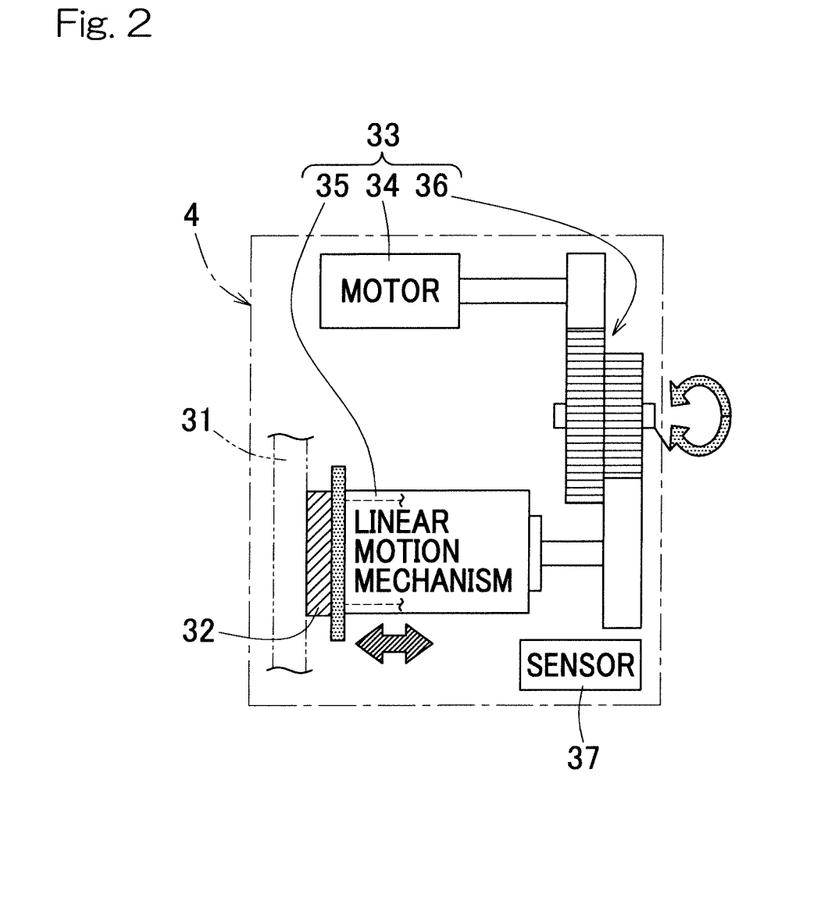
FIG. 2 is a schematic diagram of a brake actuator of the friction brake system.

For example, as shown in FIG. 2, the brake actuator 4 includes a brake rotor 31, a friction material 32, and a friction material actuator 33 that presses the friction material 32 against the brake rotor 31, and is also provided with a sensor 37 that detects a state quantity of the brake actuator 4. The brake rotor 31 is integrally fixed to each wheel 2 and rotates therewith. The friction material actuator 33 includes: an electric motor 34 serving as a drive source; a linear motion mechanism 35 that converts rotation of the motor 34 to a reciprocating linear motion of the friction material 32; and a speed reducer or reduction gear 36 such as a gear train that reduces the speed of rotation of the motor 34 and transmits the reduced rotation to the linear motion mechanism 35.

As the motor 34, a brushless DC motor is considered to be suitably used, since a small-size high-speed electric servo system can be realized with the brushless DC motor. However, a DC motor with brush or inductive motor, or the like, may be used. As the linear motion mechanism 35, for example, various screw mechanisms, a ball lamp mechanism, or the like can be used. In addition, as the speed reducer 36, spur gears are considered to be suitably used, since the spur gears are inexpensive. However, worm gears, planetary gears, or the like can be used.

As the sensor 37, for example, a motor angle sensor or a motor current sensor that detects a state quantity of the motor 34 may be used, and a brake pressing force sensor that detects a result of output of the brake actuator 4 or the like, a position sensor that detects an advance/retreat position of the linear motion mechanism 35, or the like may be used. The sensor 37 that performs such detection is considered to be suitably provided, since a high-accuracy/high-speed electric brake control system can be established when the sensor 37 is provided. An encoder or a resolver is considered to be suitably used as the angle sensor, a shunt resistor or a Hall element is considered to be suitably used as the current sensor, or a Hall element, a strain sensor, or the like is considered to be suitably used as the brake pressing force sensor. The reasons thereof are because they are inexpensive and can be mounted in a small space. The friction brake system may be configured to operate on the basis of estimation without using such a special sensor element, that is, of sensorless estimation.

In FIG. 1, the brake actuator 4 of each friction brake device 3 is controlled by the individual brake controller 5 and a brake integrated control unit 7 provided in a higher-order ECU 6 that is higher-order control unit. The higher-order ECU 6 is an electric control unit that performs cooperative control and integrated control of the entirety of the vehicle 1, control of a drive source (not shown) of the vehicle 1 in accordance with an operation amount of accelerator operation portion (not shown), and the like, and is sometimes referred to as VCU. The brake integrated control unit 7 collectively shows each control unit, regarding brake control, included in the higher-order ECU 6.

Figure 3:
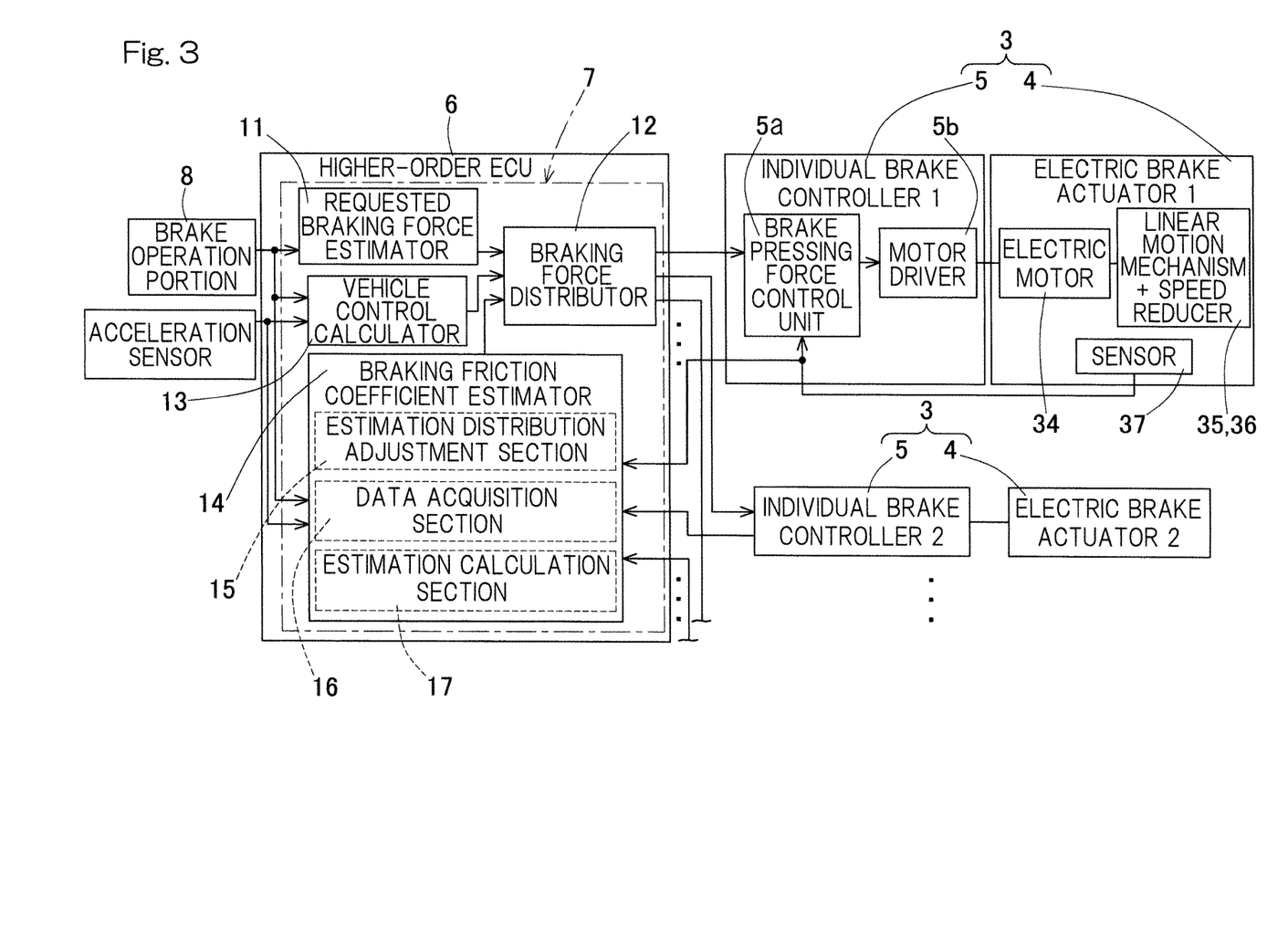
FIG. 3 is a block diagram of a schematic configuration of the friction brake system.

FIG. 3 shows a configuration example of the brake system including the higher-order ECU 6, a plurality of the individual brake controllers 5, and the actuators 4. FIG. 3 shows an example in which the electric friction brake devices 3 each using the electric motor 34, the linear motion mechanism 35, etc. are applied. With this configuration, the friction brake device 3 for each wheel 2 can be easily controlled at a high speed with high accuracy, and this configuration is considered as a suitable system configuration for applying the friction brake system of the embodiment.

In FIG. 3, the individual brake controller 5 of each friction brake device 3 includes: a brake pressing force control unit 5a that controls actual brake pressing force so as to follow (target) brake pressing force that is a load command value inputted from a braking force distributor 12 of the higher-order ECU 6; and a motor driver 5b that inputs power to the electric motor 34 on the basis of a calculation result of the brake pressing force control unit 5a. As the brake pressing force control unit 5a, for example, a microcomputer, ACIC, FPGA, DSP, or the like is considered to be suitably used, since a controller capable of performing complicated calculation can be configured at a low cost. The motor driver 5b is considered to be suitably configured by using switching elements such as MOSFETs, since the motor driver 5b becomes inexpensive. The motor driver 5b may include a predriver for instantaneously driving the switching elements.

The higher-order ECU 6 includes, as respective means forming the brake integrated control unit 7, a requested braking force estimator 11 that estimates braking force requested by a driver with a brake operation portion 8, the braking force distributor 12 that determines respective target brake pressing forces to be inputted to each friction brake device 3 so as to correspond thereto, a vehicle control calculator 13 that performs brake control based on vehicle behavior of an electric brake system-equipped vehicle that is the vehicle 1, and a braking friction coefficient estimator 14 that estimates a friction coefficient between the friction material 32 and the brake rotor 31 (FIG. 2) of each friction brake device 3. The brake integrated control unit 7 may be provided in a dedicated ECU or the like independent of the higher-order ECU 6, but is considered to be suitably implemented in the higher-order ECU 6 or the like for the vehicle, which is, for example, a powerful high-speed calculation device.

The brake operation portion 8 is, for example, a brake pedal, but may be operation portion other than a pedal type. Also, the brake operation portion 8 may be braking force generating portion that is provided in the higher-order ECU 6 or the like and that is used for the purpose of vehicle control. The requested braking force estimator 11 estimates braking force requested by the driver, on the basis of output of a detection sensor detecting an operation amount included in the brake operation portion 8. The braking force distributor 12 basically outputs a load command value (target brake pressing force) distributed to each friction brake device 3, according to a determined rule in accordance with an operation amount of the brake operation portion 8, that is, the requested braking force estimated by the requested braking force estimator 11, and the distribution is adjusted by the vehicle control calculator 13 and the braking friction coefficient estimator 14.

The vehicle control calculator 13 has one or more of functions including various types of vehicle control such as control of braking front/rear distribution in accordance with forward-rearward acceleration or vehicle characteristics such as front-rear weight distribution, control of braking right/left distribution in accordance with turning or the like, side slip prevention control, and other control using the friction brake device 3. In addition, brake torque is distributed in a predetermined amount on the basis of a result of friction coefficient estimation by the braking friction coefficient estimator 14 described later, and is considered to be suitably converted and outputted to brake pressing force for each of the above wheels on the basis of a brake effective diameter and the braking friction coefficient, since braking force distribution that is not influenced by an error of the braking friction coefficient can be achieved. In addition to the above functions, the vehicle control calculator 13 may have functions including various types of vehicle control such as control of braking front/rear distribution in accordance with forward-rearward acceleration or vehicle characteristics such as front-rear weight distribution, control of braking right/left distribution in accordance with turning or the like, side slip prevention control, and other control using the brake.

The braking force distributor 12 calculates the brake pressing force that can exert desired braking torque (brake torque), on the basis of a result of the friction coefficient estimation by the braking friction coefficient estimator 14 described later, and sends the calculated brake pressing force as a target value to the friction brake device 3. The "desired braking torque" is torque that should be distributed to or has been distributed to each friction brake device 3 in accordance with the requested braking force. In this case, the brake torque to be distributed may be converted and outputted to brake pressing force for each wheel 2 on the basis of the brake effective diameter, the braking friction coefficient, or the like. Since the braking force distributor 12 is configured to perform distribution on the basis of the result of the friction coefficient estimation as described above, a braking force error of each wheel due to a friction coefficient error can be corrected.

The braking friction coefficient estimator 14 estimates a braking friction coefficient that is the friction coefficient between the brake rotor 31 and the friction material 32, and includes an estimation distribution adjustment section 15, a data acquisition section 16, and an estimation calculation section 17.

The estimation distribution adjustment section 15 changes brake pressing force distributed and outputted from the braking force distributor 12, in a predetermined combination by a later-described determinant or the like, for estimation of the friction coefficient. The data acquisition section 16 acquires data for estimation of the friction coefficient. The estimation calculation section 17 performs estimation calculation of the braking friction coefficient on the basis of the data acquired by the data acquisition section 16, and estimates the friction coefficient on the basis of a relationship between deceleration of the vehicle and the brake pressing force the distribution of which has been changed.

The estimation distribution adjustment section 15 changes distribution of the load command value distributed from the braking force distributor 12, for estimating the friction coefficient by the estimation calculation section 17. The friction coefficient estimation calculation section or the above-mentioned estimation calculation section 17 estimates the friction coefficient between the brake rotor 31 and the friction material 32 of the friction brake device 3. In addition, the friction coefficient estimation calculation section 17 has a function to estimate the friction coefficient on the basis of a relationship between deceleration of the vehicle and the load command value the distribution of which has been changed.

The operation and effect by the above configuration and a specific configuration example of each of the above means will be described with reference to flowcharts of FIGS. 4 to 7. Step S1 in FIG. 4 is performed by the requested braking force estimator 11 in FIG. 3, and the other steps S2 to S9 in FIG. 4 are performed by the friction coefficient estimation calculation section 17 of the braking friction coefficient estimator 14 in FIG. 3.

Step S1: requested braking force B requested by the driver or the vehicle 1 is estimated on the basis of a brake pedal operation amount outputted by the brake operation portion 8, braking force that is generated by the higher-order ECU 6 and used for the purpose of vehicle control, or a result including both the brake pedal operation amount and the braking force.

Step S2: the requested braking force B represented by a torque value or the like is compared to a predetermined value. When the requested braking force B is not less than the predetermined value, braking friction coefficient estimation in step S3 and subsequent steps is executed (estimation is started). For example, in a region where the braking force is weak, when deceleration that can occur is very low, the reliability of the braking friction coefficient estimation described later may decrease. In the above-mentioned region where the braking force is weak, influence of an error of the braking friction coefficient on vehicle behavior is also very small, and thus the following process is considered to be suitably performed. The predetermined value is optionally determined on the basis of a simulation result, an experimental result, an actual measurement result, or the like (the same applies below).

Step S4: a brake distribution matrix d that is used for the braking friction coefficient estimation and corresponds to a condition r for distribution to each wheel is determined. At this time, it is a necessary and sufficient condition for estimation that the distribution matrix d is a full rank square matrix for the number n of the friction brake devices 3 of the friction brake system (for example, in the case of a four-wheel automobile, a matrix with n=4, a size of 4×4, and a rank of 4). Distribution that meets this condition is considered to be suitably defined in a table or the like in advance, since a calculation load can be reduced.

Step S5: for acquiring data per row of the distribution matrix d, a variable m for managing the number of data is provided, and the value of m is initialized.

Step S6: brake pressing force F for each wheel 2 is set as follows. The brake pressing force F (Fm: 0<m≤n) for each wheel 2 is obtained by [brake torque for brake wheel]÷[braking friction coefficient]÷[brake effective diameter]. At this time, for example, the braking friction coefficient is set with a value estimated last time. However, a preset nominal value or the like may be used in a predetermined condition such as at the time of estimation for the first time at which a value estimated last time cannot be used.

Step S7: each brake pressing force F (or actual brake pressing force Fb, or both forces) that is a target in the distribution condition r (in the brake distribution matrix d determined in step S4) and vehicle deceleration G at this time are acquired as data of one row (n columns therein). At this time, the actual brake pressing force Fb is delayed relative to the target brake pressing force F due to influence of the inertia of the electric motor 6 or a valve 43 (FIG. 8) or the like, and the actual vehicle deceleration G is delayed relative to the actual brake pressing force Fb due to influence of the inertia of the wheel 2 or the like. Thus, values obtained through a filter (not shown) or the like for eliminating these influences may be used as data for estimation.

Step S8: a braking friction coefficient $\mu$ is obtained by the shown expression, $\mu = r^{-1} Fb^{-1} G$. Regarding a system of units, processing therefor is performed such that the units in respective parameters coincide. After the braking friction coefficient $\mu$ is obtained, the friction coefficient estimation is ended (step S9).

As described above, the estimation calculation section 17 of the braking friction coefficient estimator 14 estimates (calculates) the friction coefficient on the basis of calculation of an equation including the friction coefficient, the brake pressing force pressing the friction material 32, and the vehicle deceleration which are calculation factors, and a predetermined coefficient based on vehicle specifications for satisfying the equation using all of these calculation factors. The equation may be configured on the basis of a plurality of independent linear expressions the number of which is equal to the number of the friction brake devices for which the friction coefficient is estimated by the friction coefficient estimation calculation section. The braking friction coefficient estimator 14 can achieve estimation of the friction coefficient in this manner. The "vehicle specifications" are respective physical quantities of each component forming the vehicle, and are, for example, the effective diameter of each wheel 2, the total weight of the vehicle, or the like.

Figure 5:
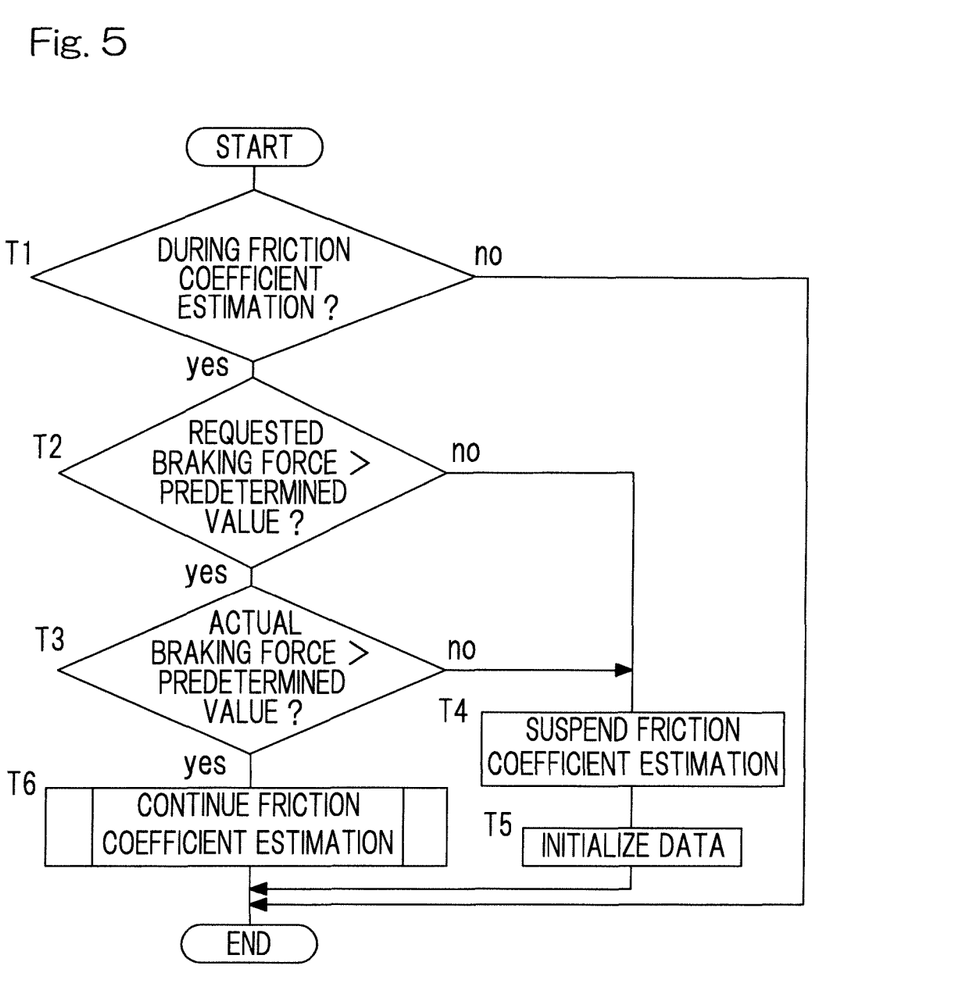

FIG. 5 shows a method executed in the case where the braking friction coefficient estimation that is a series of processes shown in FIG. 4 is suspended when the requested braking force falls below the predetermined value or is likely to fall below the predetermined value during the estimation. It is determined whether or not it is during the friction coefficient estimation (step T1). When it is during the estimation, the following process is performed. The requested braking force B is compared to a predetermined value (set optionally) (step T2). When the requested braking force is not greater than the predetermined value, the friction coefficient estimation is suspended (step T4), each data to be used for estimating the friction coefficient is initialized (step T5), and the process is ended.

As a result of the comparison between the requested braking force and the predetermined value (step T2), when the requested braking force is greater than the predetermined value, actual braking force and the predetermined value are compared to each other (step T3). When the actual braking force is not greater than the predetermined value, the actual braking force is likely to fall below the requested braking force. Thus, similarly to the case where the requested braking force is not greater than the predetermined value, the friction coefficient estimation is suspended (step T4), each data is initialized (step T5), and the process is ended. When the actual braking force is greater than the predetermined value at the time of the determination in step T3, this friction coefficient estimation process is continued (step T6).

As shown in the example in FIG. 5, the estimation calculation section 17 of the braking friction coefficient estimator 14 may be configured to execute estimation of the friction coefficient when either one or both of the requested braking force and the actual brake pressing force are not less than the predetermined value, and the vehicle speed of the friction brake system-equipped vehicle or the lowest value of the wheel speeds of the respective wheels 2 to be braked by the friction brake devices is not less than a predetermined value. Accordingly, a very low speed region in which deceleration easily includes an error can be excluded from a target for the estimation, and the accuracy or reliability of estimation of the friction coefficient can be increased.

FIG. 6 shows an example in which the braking friction coefficient estimation shown in FIG. 4 is performed when the requested braking force changes by a predetermined amount or greater. While the braking friction coefficient estimation is performed, braking force variation depending on an error of the braking friction coefficient estimation occurs due to the brake distribution (condition r) shown in step S4 in FIG. 4 being changed. At this time, it is considered that the degree of a bodily sensation of the braking force variation is generally more reduced in the case where the driver has intention of changing the braking force than the case where the driver has intention of keeping the braking force constant. The process in FIG. 6 does not need to be performed when the braking friction coefficient estimation is frequently performed and it is assumed that the accuracy of the estimation is high and no error is included, and the process in FIG. 6 may be appropriately applied as necessary.

The process in FIG. 6 will be described in step order. It is determined whether or not acquisition of m-th data (m is an acquired data number management variable) has been completed (step U1). When the acquisition has not been completed, the friction coefficient estimation is continued (step U5). When the acquisition has been completed, the absolute value of an amount of change (dB/dt) of the requested braking force B per unit time is compared to a predetermined value (set optionally) (step U2). When the absolute value of the amount of change is not greater than the predetermined value, the friction coefficient estimation is continued (step U5). When the absolute value of the amount of change is greater than the predetermined value, only 1 is added to the acquired data number management variable m (step U3), the next brake pressing force Fm is updated (step U4), and the friction coefficient estimation is continued (step U5).

As described above, the estimation calculation section 17 of the braking friction coefficient estimator 14 may be configured such the plurality of independent linear expressions (each expression in step S6 in FIG. 4, or the like) are obtained on the basis of the brake distribution changed when the absolute value of the change amount of the requested braking force is not less than the predetermined value. Accordingly, deceleration change due to the distribution change when an estimation result of the friction coefficient includes an error can be made inconspicuous, thereby improving feeling.

Figure 7:
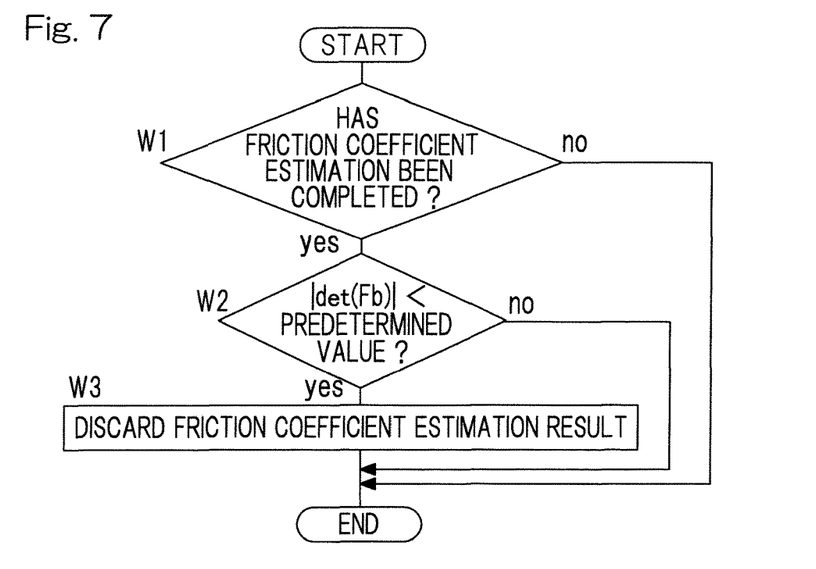
FIG. 7 is a flowchart of a process in which a result of the estimation by the friction brake system is discarded, depending on a situation, after the basic process of the estimation is performed.

FIG. 7 shows an example in which a process of discarding the estimation result is performed when the absolute value of the determinant used at the time of estimation is lower than a predetermined value after the friction coefficient estimation in FIG. 4 is completed. As the determinant is closer to zero, the linear independency of a matrix Fb (having the data of n columns for a plurality of rows) is lower, and it is easier to receive strong influence of an error such as noise. Thus, from the viewpoint of improvement of the reliability of the estimation result, it is considered to be suitable to use the process in FIG. 7 or to perform a process of applying a strong forgetting coefficient in advance in the case of combining and using a plurality of estimation results through a predetermined forgetting coefficient.

In the example of FIG. 7, it is determined whether the friction coefficient estimation has been completed, that is, whether or not the series of processes in FIG. 4 has been completed (step W1). When the series of processes has been completed, the absolute value (|det(Fb)|) of the determinant and a predetermined value (determined optionally) are compared to each other (step W2). When the absolute value of the determinant is less than the predetermined value, the estimation result of the friction coefficient is discarded (step W3). As described above, the estimation calculation section 17 of the braking friction coefficient estimator 14 may be configured such that, when the absolute value (|det(Fb)|) of the calculation result of the determinant of the full rank matrix including the brake pressing force in the plurality of independent linear expressions is less than the predetermined value, influence of a friction coefficient estimation result derived by using the determinant, on a finally derived friction coefficient estimation result, is made smaller than influence of another friction coefficient estimation result derived when the absolute value is greater than the predetermined value, or the friction coefficient estimation result derived by using the determinant is excluded from estimation results. By extracting, in this manner, an estimation result for which the linear independency is low and which is easily influenced by noise or an estimation error, the reliability of the estimated value of the friction coefficient can be improved.

The requested braking force estimator 11, the braking force distributor 12, the vehicle control calculator 13, the estimation distribution adjustment section 15, and the estimation calculation section 17 are specifically configured with a hardware circuit or a software function on a processor (not shown) that is capable of performing calculation and outputting a result by using a LUT (Look Up Table) implemented by software or hardware, or a predetermined transform function contained in a library of software, or hardware equivalent to this, and/or a matrix calculation function or hardware equivalent to this, etc.

In the above embodiment, the following process may be further added. For example, a counter or the like that measures an elapsed time after the braking friction coefficient estimation is performed may be provided, and a limitation value for predetermined frequency may be provided for the braking friction coefficient estimation such that the braking friction coefficient estimation is executed only when the counter indicates a value equal to or greater than a predetermined value. In addition, in changing the brake distribution in the above process, in order to avoid a rapid response of braking, a process may be performed such that the distribution is gently changed.

According to this embodiment, since the distribution to each friction brake device 3 after the friction coefficient is estimated is enabled as described above, stable vehicle behavior and brake feeling of each friction brake device 3 can be achieved with high accuracy during braking.

Figure 8:
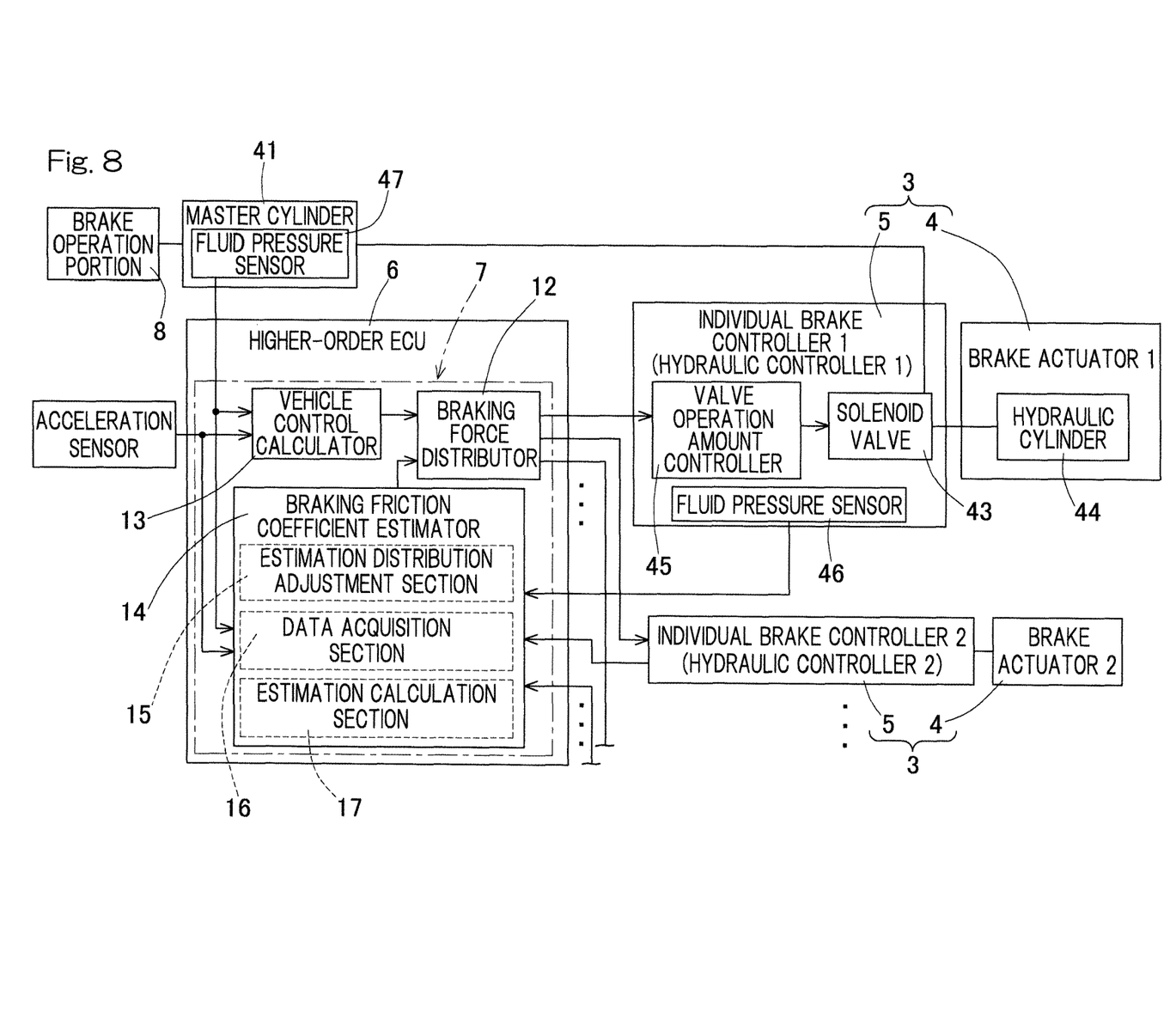
FIG. 8 is a block diagram of a schematic configuration of a friction brake system according to another embodiment of the present invention.

FIG. 8 shows an example in the case where each friction brake device 3 is a hydraulic friction brake device in a friction brake system of another embodiment. In the case of a hydraulic type, a brake system is configured in which the fluid pressure of the friction brake device 3 for each wheel 2 (see FIG. 1) is independently controlled by a master cylinder 41 that generates a common fluid pressure in the friction brake device 3 for each wheel 2, and the valve 43 that is provided for each wheel 2. The fluid pressure by the master cylinder 41 is controlled by the brake operation portion 8 such as a brake pedal. Each friction brake device 3 includes a hydraulic cylinder 44 as a drive source for the brake actuator 4 thereof. The brake controller 5 includes a valve operation amount controller 45 and the valve 43 composed of a solenoid valve or the like. Fluid pressure sensors 46 and 47 are provided in each valve operation amount controller 45 and the master cylinder 41, respectively. The example of FIG. 8 is the same as the first embodiment described above with reference to FIGS. 1 to 7, except for the matters described in particular.

In the case where each friction brake device 3 is a hydraulic type as described above, there is a possibility that controllability or quietness becomes a problem, but the friction brake system can be configured at relatively low cost, as compared to the friction brake system using the electric friction brake devices 3.

FIGS. 3 and 8 are each a schematic diagram of the friction brake system showing extracted components required for the embodiment, and, for example, redundant functions or the like, and other functions can be appropriately added as necessary in configuring the system.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . vehicle
3 . . . friction brake device
4 . . . brake actuator
5 . . . individual brake controller
6 . . . higher-order ECU
7 . . . brake integrated control unit
11 . . . requested braking force estimator
12 . . . braking force distributor
13 . . . vehicle control calculator
14 . . . braking friction coefficient estimator
15 . . . distribution adjustment section
16 . . . data acquisition section
31 . . . brake rotor
32 . . . friction material
33 . . . friction material actuator

What is claimed is:

1. A friction brake system comprising a plurality of friction brake devices provided in a vehicle, and a higher-order control unit including a braking force distributor configured to distribute target brake pressing force to each friction brake device in accordance with requested braking force, each friction brake device including:
   a brake actuator having a brake rotor, a friction material, and a friction material actuator configured to press the friction material against the brake rotor; and
   an individual brake controller configured to control output of the friction material actuator in accordance with the target brake pressing force distributed from the braking force distributor, wherein
   the friction brake system comprises
      a braking friction coefficient estimator configured to estimate a friction coefficient between the brake rotor and the friction material of each friction brake device based on a relationship between deceleration of the vehicle and a change in brake pressing force to be distributed from the braking force distributor, the friction coefficient being reflected by distribution of the brake pressing force by the braking force distributor, and perform a calculation on the basis of a calculation of an equation including the friction coefficient, and the brake pressing force pressing the friction material, and a vehicle deceleration, which are calculation factors, and a predetermined coefficient based on vehicle specifications for satisfying the equation using all of these calculation factors, and the equation is configured on the basis of a plurality of independent linear expressions the number of which is equal to the number of the friction brake devices for which the friction coefficient is estimated by the braking friction coefficient estimator, and
      an estimation distribution adjustment section configured to change the brake pressing force to be distributed from the braking force distributor, in a predetermined combination, for estimation of the friction coefficient.

2. The friction brake system as claimed in claim 1, wherein the braking force distributor has a function to calculate the target brake pressing force to be distributed to each friction brake device, such that the friction coefficient of each friction brake device estimated by the braking friction coefficient estimator is reflected therein.

3. The friction brake system as claimed in claim 2, wherein the braking force distributor calculates the brake pressing force that can exert desired braking torque, on the basis of an estimation result of the braking friction coefficient estimator, and sends the calculated brake pressing force as a target value to the friction brake device.

4. The friction brake system as claimed in claim 2, wherein each friction brake device is an electric friction brake device including an electric motor configured to drive the friction material actuator, and the individual brake controller has a function to control the motor such that the brake pressing force distributed from the braking force distributor follows a target value.

5. The friction brake system as claimed in claim 1, wherein the braking friction coefficient estimator is configured such that, when an absolute value of a calculation result of a determinant of a full rank matrix including the brake pressing force in the plurality of independent linear expressions is less than a predetermined value, influence of a friction coefficient estimation result derived by using the determinant, on a finally derived friction coefficient estimation result, is made smaller than influence of another friction coefficient estimation result derived when the absolute value is greater than the predetermined value, or the friction coefficient estimation result derived by using the determinant is excluded from estimation results.

6. The friction brake system as claimed in claim 1, wherein, in the braking friction coefficient estimator, the plurality of independent linear expressions are acquired on the basis of brake distribution changed when an absolute value of an amount of change of the requested braking force is not less than a predetermined value.

7. The friction brake system as claimed in claim 1, wherein the braking friction coefficient estimator executes estimation of the friction coefficient when: either one or both of the requested braking force and the actual brake pressing force are not less than a predetermined value; and a vehicle speed of the vehicle equipped with the friction brake system or a lowest value of wheel speeds of the respective wheels to be braked by the friction brake device is not less than a predetermined value.

8. The friction brake system as claimed in claim 1, wherein each friction brake device is composed of an electric friction brake device including an electric motor as a drive source for the friction material actuator.

* * * * *